US006918247B1

(12) United States Patent
Warner

(10) Patent No.: US 6,918,247 B1
(45) Date of Patent: Jul. 19, 2005

(54) ASSISTED HYDRAULIC SYSTEM FOR MOVING A STRUCTURAL MEMBER

(76) Inventor: Jack E Warner, P.O. Box 87, Elkhart, IN (US) 46515

( * ) Notice: Subject to any disclaimer, the term of this patent is extended or adjusted under 35 U.S.C. 154(b) by 0 days.

(21) Appl. No.: 10/717,153

(22) Filed: Nov. 19, 2003

(51) Int. Cl.[7] .............................................. F16D 31/02
(52) U.S. Cl. .......................................... 60/414; 92/134
(58) Field of Search ........................... 92/134; 60/413, 60/414; 414/680, 685

(56) References Cited

U.S. PATENT DOCUMENTS 4,362,438 A * 12/1982 Spink .......................... 60/413
4,761,954 A * 8/1988 Rosman ....................... 60/414
6,009,709 A * 1/2000 Bailey ....................... 60/605.2

* cited by examiner

*Primary Examiner*—Edward K. Look
*Assistant Examiner*—Michael Leslie
(74) *Attorney, Agent, or Firm*—Krieg DeVault Lundy LLP

(57) ABSTRACT

A system is provided having a hydraulic circuit configured to move one structural member relative to another, and an assist cylinder connected between the structural members and configured to generate and retain potential energy when the one structural member moves from a greater potential energy position to a lower potential energy position, and to convert the potential energy to kinetic energy used to generate a force exerted through the assist cylinder that assists the hydraulic circuit in returning the one structural member toward the position of greater potential energy.

29 Claims, 5 Drawing Sheets

ASSISTED HYDRAULIC SYSTEM FOR MOVING A STRUCTURAL MEMBER

DETAILED DESCRIPTION OF EMBODIMENTS OF THE INVENTION

Figure 1:
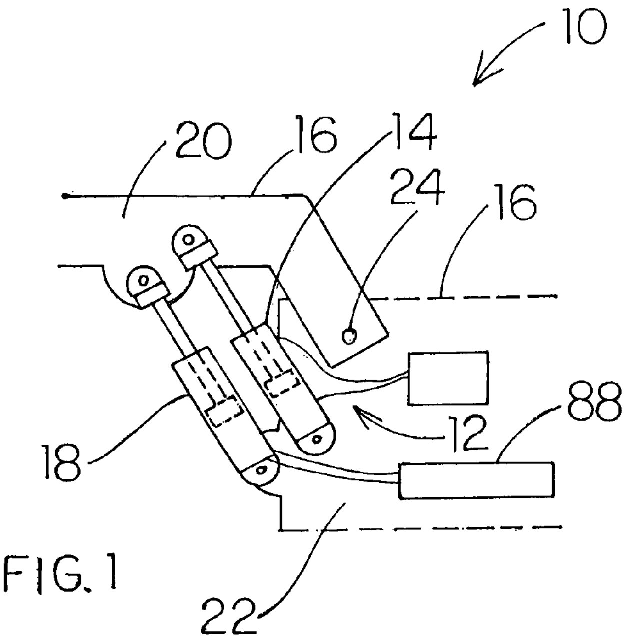
FIG. 1 is a fragmentary side view of one version of the system having a hydraulic circuit assisted by an assist cylinder connected between two structural members.

Although the disclosure hereof is detailed and exact in order to enable those skilled in the art to practice the invention, the various versions herein disclosed merely exemplify the invention which may be embodied in other specific structure. The scope of the invention is defined in the claims appended hereto.

A system 10 is provided in the versions of the present invention in which a hydraulic circuit 12 having a hydraulic cylinder 14 connected between two structural members 16 is employed to move one of the structural members relative to the other, an assist cylinder 18 being additionally employed to capture potential energy when the one structural member is moved from a relatively greater potential energy position to a relatively lower or zero potential energy position. The captured potential energy is then converted to kinetic energy that is used to generate a force exerted through the assist cylinder that assists the hydraulic circuit in the return of the one structural member toward the position of greater potential energy.

One contextual example of the use of the system is a boom 20 pivotally connected to a support 22 for raising and lowering the boom 20 about the pivot point 24. When in a raised position, the boom 20 has a greater potential energy than when in a lowered position. When moved from the raised position to the lowered position by the hydraulic circuit 12, the potential energy difference ordinarily lost is captured by the assist cylinder 18 of the system 10 and converted to kinetic energy when the hydraulic circuit is controlled to again raise the boom. The assist cylinder is configured to channel the kinetic energy into an assisting force that lifts the boom toward the raised position, thus both speeding up the raising of the boom 20 and allowing smaller and less expensive components to be utilized.

The scope of the disclosure and the attached claims includes any use of a hydraulic circuit to move one member relative to another from a position of greater potential energy to a position of lower potential energy, combined with the use of an assist cylinder to capture the potential energy and convert it to kinetic energy to assist additional movement of the member with less additional energy used by the hydraulic circuit. The system having a boom 20 pivotally connected to a boom support 22 is for illustrative purposes only. Examples of such systems include excavators, backhoes, and cranes. Aspects of an excavator using the system are generally shown in the drawings.

As shown in the drawings, a system 10 for hydraulically raising and lowering a boom 20 that is pivotally connected at one end to a boom support 22 comprises a hydraulic circuit 12 connected to the boom and boom support and an assist cylinder 18 connected between the boom 20 and boom support 22. The hydraulic circuit 12 is configured to controllably raise and lower the boom 20 relative to the boom support 22. The assist cylinder 18 has first and second ends 26, 28 pivotally secured to the boom 20 and the boom support 22, respectively. In one version, the assist cylinder 18 comprises a hollow interior 30 that contains a compressible medium 32. In other versions, the compressible medium 32 comprises any suitable compressible gas, such as nitrogen, air and oxygen containing gases are less preferred because of their explosive possibilities.

Figure 2:
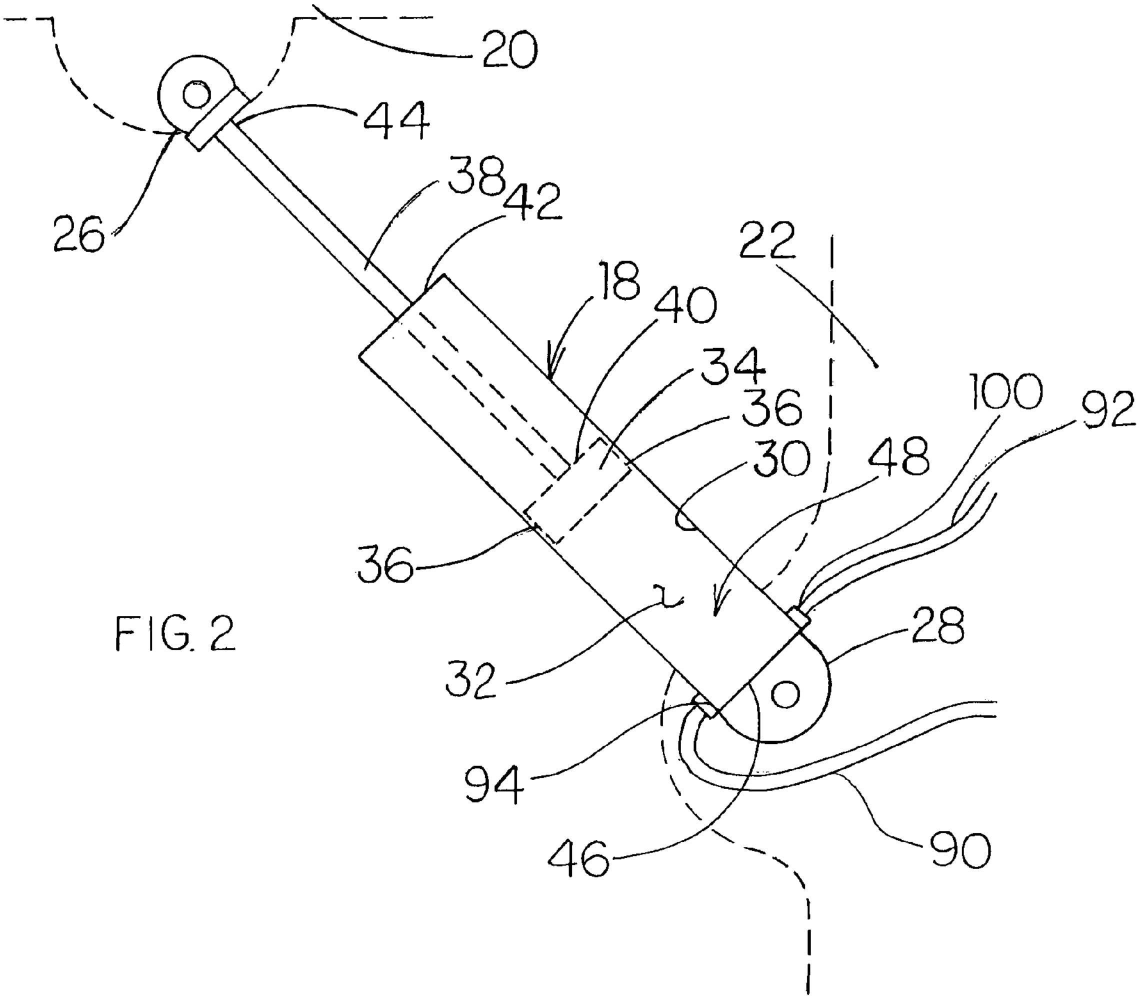
FIG. 2 is a fragmentary side view of an assist cylinder according to one version of the present invention.

As shown in FIG. 2, in one version the assist cylinder 18 comprises a piston 34 that is moveable within the interior 30 and sealably mounted therein about the periphery 36 of the piston. In other versions, the assist cylinder 18 further comprises a rod 38 secured on one side 40 of the piston 34 that generally extends from the interior 30 at an exit end 42 thereof. The distal end 44 of the rod 38 comprises the first end 26 of the assist cylinder 18. The interior 30 in yet other versions comprises a closed end 46 generally opposite the exit end 42. In yet other versions, the second end 28 of the assist cylinder 18 is external of the closed end 46. In yet other versions, the assist cylinder 18 comprises a typical rod-and-piston cylinder structure.

In one version, the interior 30 and the piston 34 define a dynamic chamber 48 between the closed end 46 and the piston 34. The dynamic chamber 48 sealably contains the compressible medium 32, which is compressed within the dynamic chamber when the rod 38 is retracted within the interior 30. This causes the piston 34 to move toward the closed end 46. In other versions, the rod 38 comprises a chamber 50 therein that is in fluid communication with the dynamic chamber 48 through one or more vents 52 in the medial portion 54 of the piston. The space 56 thus defined by the dynamic chamber 48 and the chamber 50 in such embodiments sealably contains the compressible medium 32, which is similarly compressed within that defined space when the rod 38 retracts and the piston 34 is moved closer to the closed end 46.

When the hydraulic circuit 12 is used to lower the boom 20 from a raised position, the rod 38 is caused to retract within the interior 30 because it is pivotally connected at the first end 26 to the boom 20. The retraction reduces the volume of the dynamic chamber 48 and correspondingly increases the pressure therein (or in the defined space 56 in embodiments also having a chamber 50 within the rod 38). The increased pressure thereby generates a corresponding potential energy within the assist cylinder 18 that is retained throughout the time the hydraulic circuit 12 is lowering the boom 20 and/or maintaining the boom in a lowered position.

Figure 3:
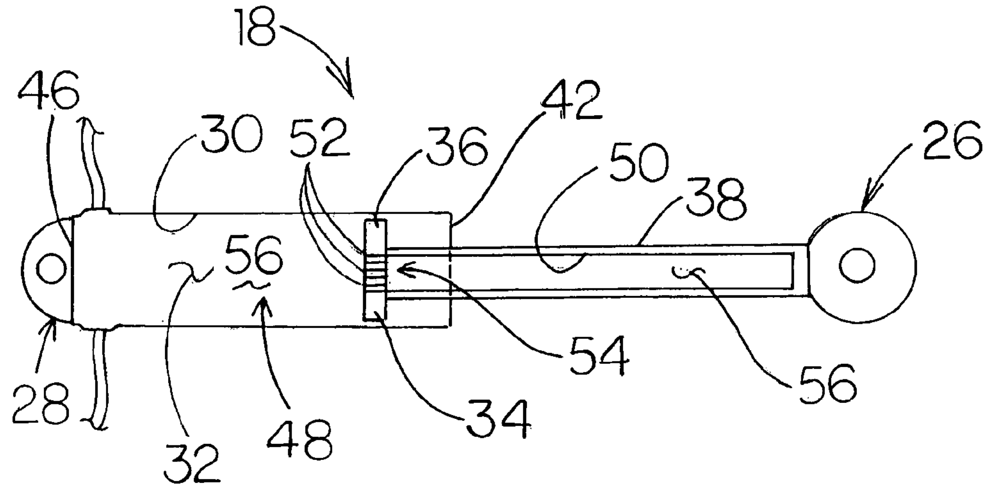
FIG. 3 is a cross-sectional view of another version of an assist cylinder according to the present invention.

When the hydraulic cylinder 14 is used to controllably raise the boom 20, whether a slight raise or a complete raise, the built-up pressure in the interior 30 is permitted to be relieved by expanding against the piston 34 with a force that causes the rod 38 to extend from the interior 30, which extension correspondingly exerts a generally upward force on the boom 20 at the first end 26 of the assist cylinder 18. See FIG. 3.

Figure 4:
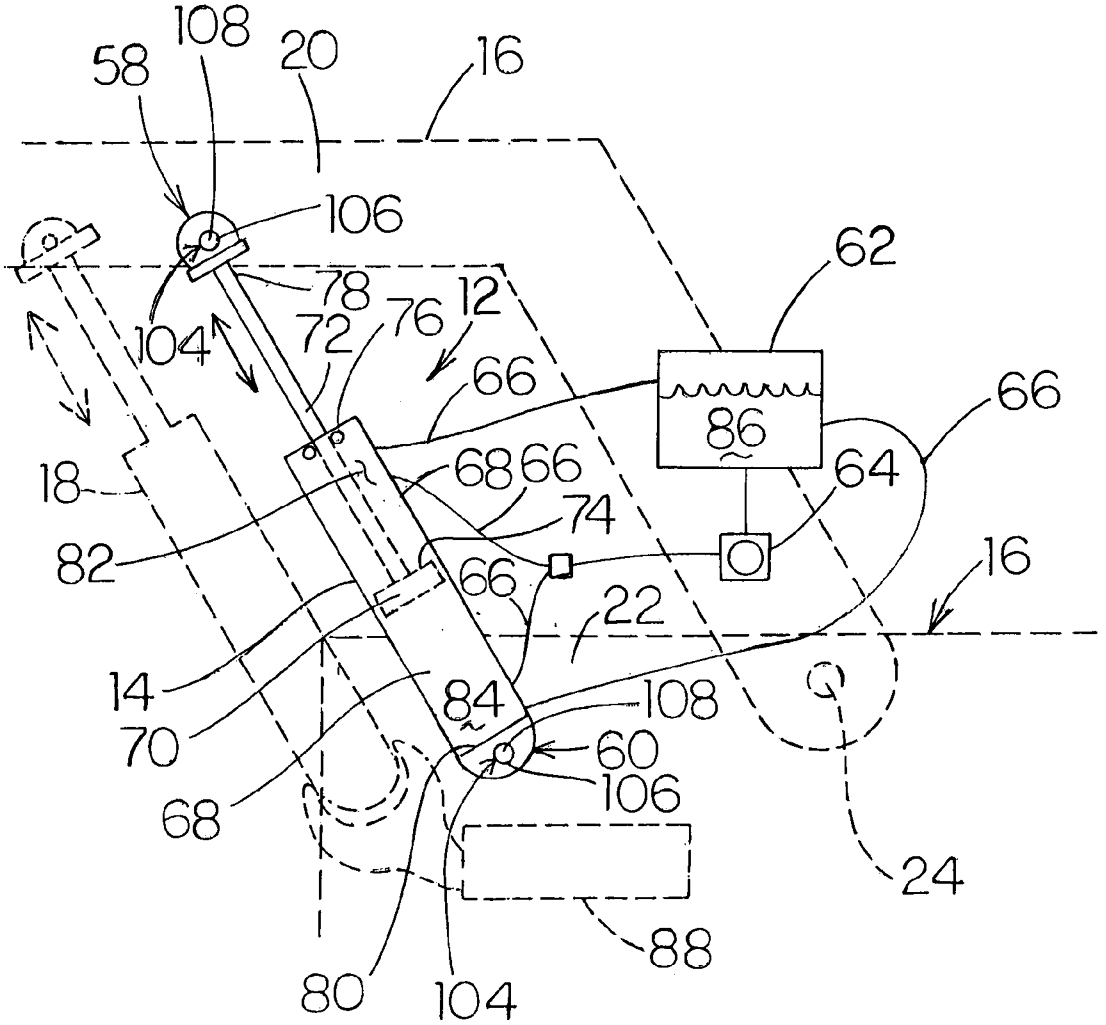
FIG. 4 is a plan view of one version of a hydraulic circuit that may be employed by the system.

As shown in FIG. 4, in one version the hydraulic circuit 12 comprises at least one hydraulic cylinder 14, each having an upper end 58 pivotally secured to the boom 20 and a lower end 60 pivotally secured to the boom support 22. Hydraulic cylinders 14 are generally known in the art for use in moving one member 16 relative to another using hydraulic principles, such as in single acting and double acting hydraulic cylinders connected to a hydraulic fluid reservoir 62 via one or more hydraulic fluid pumps 64 and hydraulic lines 66 for charging and relieving one or more cylinder chambers 68 in order to force the piston 70 therein to move one way or the other, thereby causing the rod 72 secured thereto to extend or retract, correspondingly moving a member 16, such as a boom 20, to which the rod 72 is secured.

For purposes of illustration, in one version the hydraulic cylinder 14 comprises a chamber 68, a piston 70 moveably mounted in the chamber 68, and a rod 72 secured to one side 74 of the piston 70. The rod 72 sealably extends from an exit end 76 of the chamber 68 and has a distal end 78 connected to a member 16 such as a boom 20. The cylinder 14 also has a closed end 80 of the chamber 68 generally opposite the exit end 76. External of the closed end 80 is the lower end 60. In one version, the chamber 68 further comprises first and second dynamic interior portions 82, 84 having variable volumes depending upon the position of the piston 70 within the chamber 68. The first dynamic interior portion 82 is located between the piston 70 and the closed end 80, and the second dynamic interior portion 84 is located between the piston 70 and the exit end 76. The dynamic interior portions 82, 84 each contain a volume of hydraulic fluid 86 and are in fluid communication with the hydraulic circuit 12.

In the double acting hydraulic cylinder 14, each of the first and second dynamic interior portions 82, 84 are connected to a hydraulic fluid reservoir 62 with hydraulic lines 66. The reservoir 62 in one embodiment is in fluid communication with at least one hydraulic pump 64 that is configured to selectively supply hydraulic fluid 86 from the reservoir 62 to either the first 82 or second 84 dynamic interior portion through hydraulic lines 66 connecting the pump 64 to the dynamic interior portions. Fluid 86 is selectively supplied to the first dynamic interior portion 82 in order to cause the piston 70 to move toward the exit end 76 and cause the rod 72 to extend from the chamber 68. To retract the rod 72, the opposite occurs—fluid 86 is supplied to the second dynamic interior portion 84. In one version, additional hydraulic lines 66 are provided to connect the dynamic interior 82, 84 portions directly to the hydraulic fluid reservoir 62 in order to direct fluid from the dynamic interior portion that is not being supplied the fluid from the pump 64. This facilitates movement of the piston 70 so that the dynamic interior portion which is decreasing in volume discharges fluid 86 rather than compresses the fluid, which would require more force and energy to supply fluid to the other dynamic interior portion the volume of which is being increased.

The assist cylinder 18 in some versions may further comprise an auxiliary expansion tank 88 containing compressible medium 32 in order to control the pressure in the interior 30 when the boom 20 is in any given position. For example, when an excavator is at rest, the boom 20 thereof may be in a neutral position at which pressure remains in the dynamic chamber 48 and/or the defined space 56. This pressure will cause an undesired force to be applied to the boom 20 while the excavator is at rest. Thus, means for relieving the pressure and subsequently recharging the interior 30 are provided in conjunction with the expansion tank 88 in versions described herein.

In one version, a charge line 90 and a relief line 92 fluidly connect the expansion tank 88 to the interior 30. The charge line 90 is configured to charge the interior 30 with the compressible medium 32 through a first port 94 located proximate the closed end 46. The interior 30 may be charged to a minimum pressure as desired relative to the location of the piston 34 therein. To do so, in one version, a pump 96 is provided on the charge line 90 between the tank 88 and the first port 94. The pump 96 is configured to controllably transfer the compressible medium 32 from the tank 88 to the interior 30 until the desired pressure is achieved. In other versions, a check valve 98 is provided on the charge line 90 between the pump 96 and first port 94 in order to permit compressible medium fluid flow through the charge line only in the direction of the first port.

Figure 5:
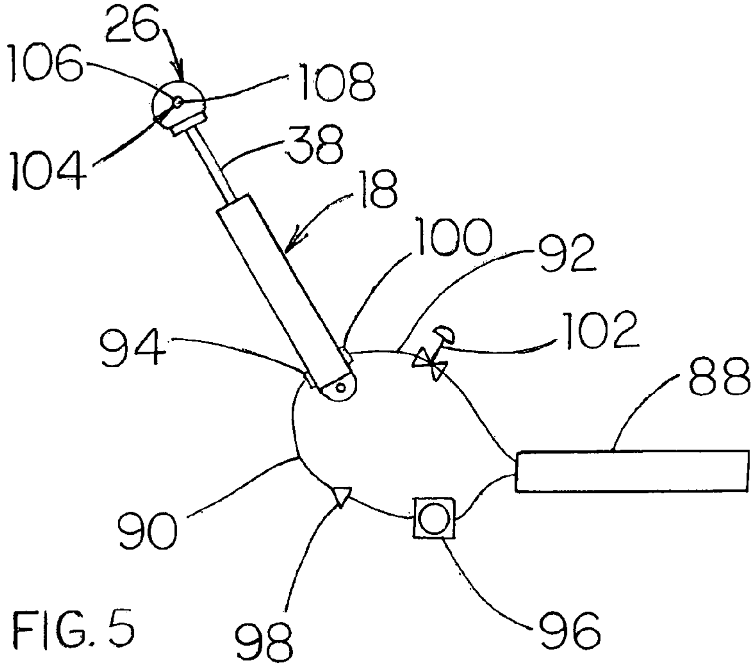
FIG. 5 is a diagrammatic view of a version of an assist cylinder comprising an auxiliary expansion tank and a circuit connecting the assist cylinder to the tank.
Figure 6:
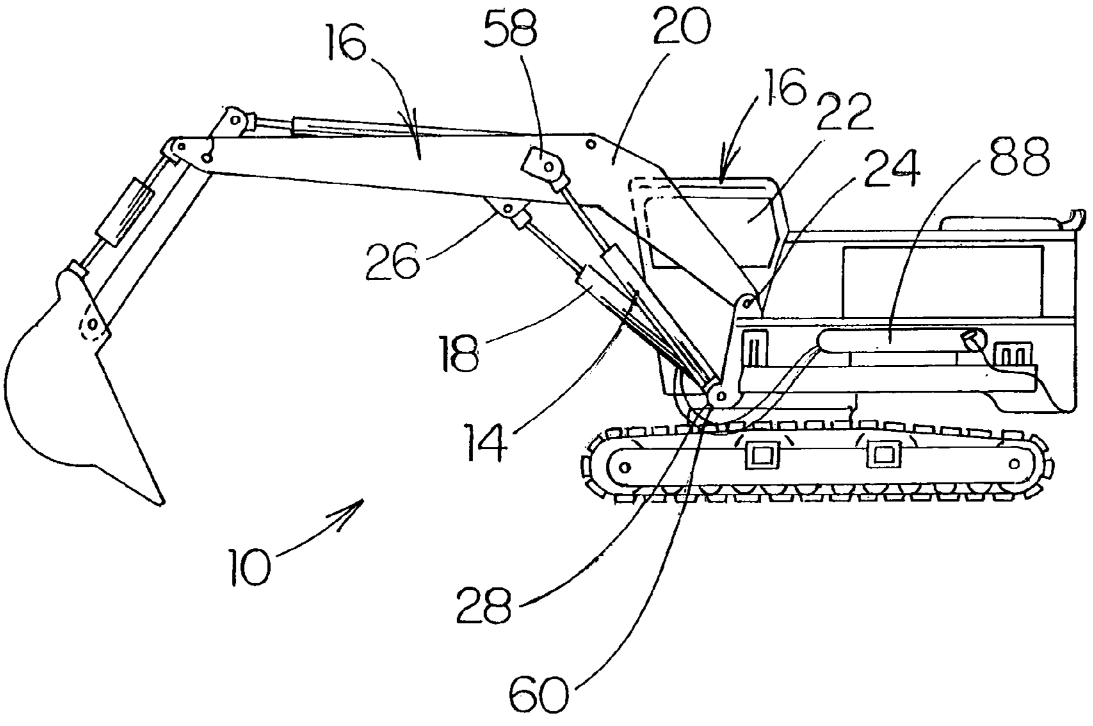
FIG. 6 is a side view of one version of a system employed by an excavator machine.

The relief line 92 is configured to remove compressible medium 32 from the interior 30 back to the tank 88 when the pressure in the interior exceeds certain threshold pressures, or when desired by an operator (not shown). In one version, the relief line 92 fluidly connects the tank 88 to the interior 30 through a second port 100 located proximate the closed end 46. In other versions, a relief valve 102 is provided on the relief line 92 between the tank 88 and the second port 100. The relief valve 102 may be configured to open and allow compressible medium 32 to exit from the second port 100 either when the interior 30 reaches the threshold pressure or when controllably and/or manually caused to do so by an operator. See FIG. 5.

In one version of an assist cylinder 18, the interior 30 comprises an inner diameter of between about 5 inches and about 1½ inches. In other versions, the inner diameter is about 10 inches. In yet other versions, the inner diameter is about 6½ inches.

In one version of a rod 38 of an assist cylinder 18 having a chamber 50 therein, the chamber comprises an inner diameter between about 2 inches and about 6 inches. In other versions, the inner diameter of the chamber is about 4½ inches.

The stroke of the assist cylinder 18 should be compatibly configured with respect to the stroke of the hydraulic cylinder 14 in the hydraulic circuit 12. In one version, the stroke of the assist cylinder 18 from full retraction to full extension is never realized because the stroke of the hydraulic cylinder 18 is fully extended or fully retracted prior to the full retraction and full extension of the assist cylinder, during operation. In other versions, the stroke of the assist cylinder is between 35 inches and 70 inches. In yet other embodiments, the stroke of the assist cylinder is about 49 inches.

In one version, the first and second ends 26, 28 of the assist cylinder 18 and/or the upper and lower ends 58, 60 of a hydraulic cylinder 14 in the hydraulic circuit 12 comprise eyes 104 that pivotally secure these ends to the boom 20 and boom support 22. In other versions, each eye 104 comprises a bearing 106. In yet other versions, each bearing 106 is configured to receive a pin 108 from the boom 20 or boom support 22 that is sized between about 2 inches and about 6 inches in diameter.

The amount of pressure built up in the interior 30 as a result of the retraction of the assist rod 38 caused by the lowering of the boom 20 by the hydraulic circuit 12 should be sufficient to assist raising the boom and requiring less expense of additional energy by the hydraulic circuit in doing so. In one embodiment, the maximum amount of potential energy generated in the assist cylinder 18 is convertible to kinetic energy used to exert a force on the boom 20 through the assist cylinder measuring between about 20,000 $lb_f$ of force and 70,000 $lb_f$ of force.

In still another version of the invention 110, boom assist mechanism 114 includes a hydraulic cylinder 140, disposed between the boom and the frame of the excavator and in accumulator 142 for assisting cylinder 140. Cylinder 140 is connected between the boom 112 and the main body of the boom support structure, and is located to work cooperatively with the primary boom lift cylinder 140 raising and lower the boom.

Figure 7:
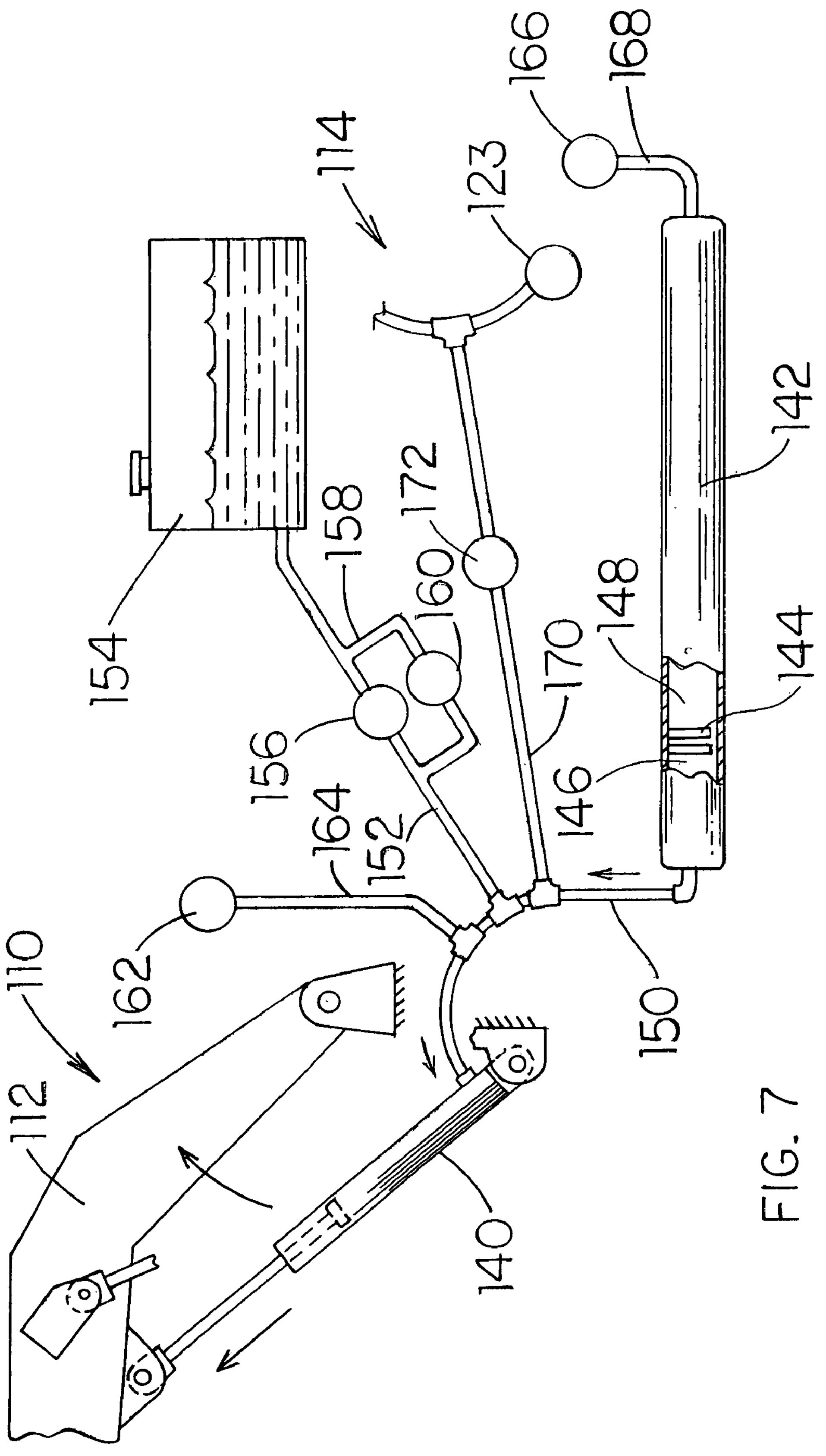
FIG. 7 is a diagrammatic fragmentary side view of still another version of the hydraulic circuit of the invention showing the boom in an elevated position.
Figure 8:
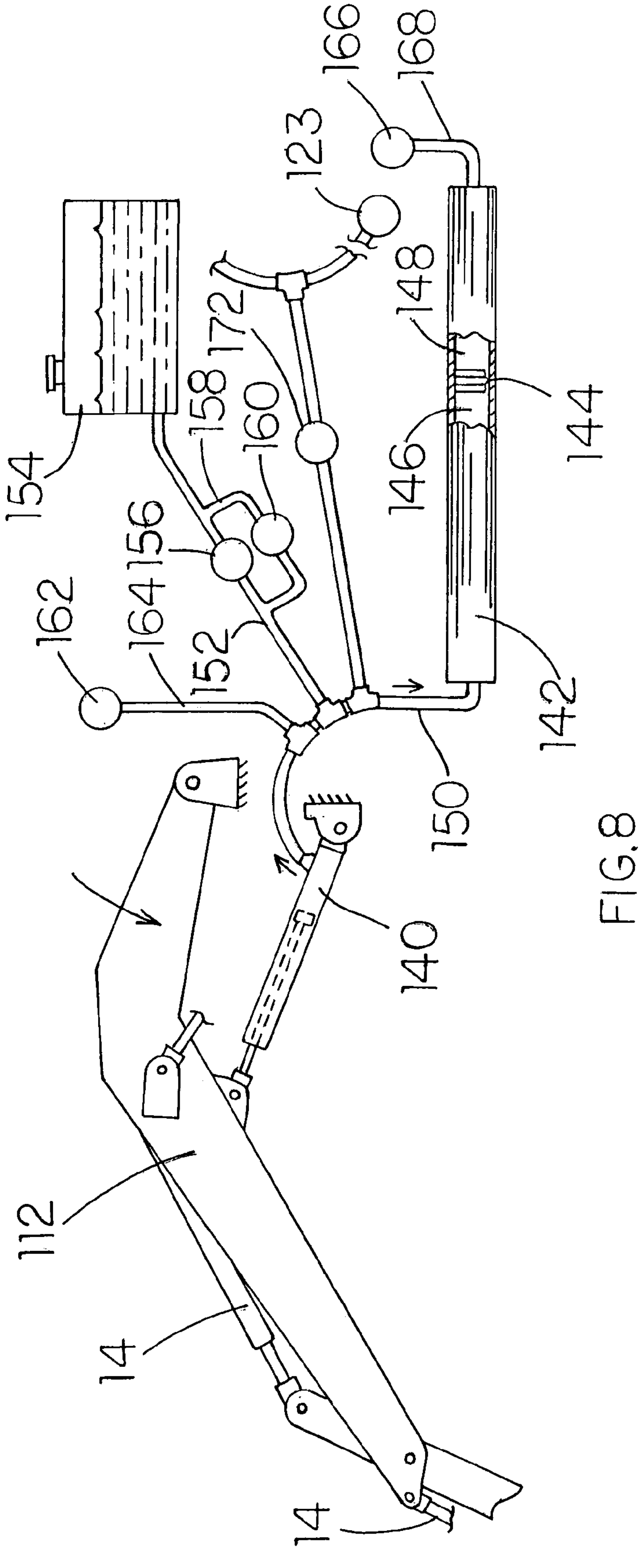
FIG. 8 is a diagrammatic fragmentary side view of the version of FIG. 7 showing the boom in the lowered position.

A movable wall 144 such as a piston shown in FIGS. 7 and 8 is disposed in the accumulator 142 and separates the interior of the accumulator in to first and second chambers 146, 148 respectively, which vary in length and therefore in volume with changes in the positions of the moveable wall 144.

A hydraulic line 150 is disposed between cylinder 140 and chamber 146 of the accumulator 142, placing the chamber 146 and the cylinder 140 in flow communication. A hydraulic line 52 is connected between line 150 and a hydraulic fluid storage tank 154 which in most circumstances can be the existing hydraulic fluid reservoir which supplies hydraulic fluid to the other hydraulically operated devices utilized with the boom 20. Thus, the present boom assist mechanism is an add-on device, functioning from the existing hydraulic circuitry. Line 152 should be connected to storage tank 154 below the minimum operated fluid level of the reservoir so that an uninterrupted fluid supply is available for assist cylinder 140 and accumulator 142. Line 152 contains a check valve 156 permitting the fluid flow from the tank to line 150 if the differential pressure between the upstream and downstream pressures is great enough to open the check valve. Return line 158 having a relief valve 160 is disposed therein and extends between locations on opposite sides of the check valve 156 to pass the check valve 156 for return flow to tank 154 if line 150 becomes overcharged. A suitable hydraulic pressure gauge 162 may be connected to line 150 by a hydraulic line 164 such that the hydraulic pressure in line 150 and cylinder 140 can be monitored. Hydraulic fluid flows through line 150 between cylinder 140 and chamber 146. Chamber 148 contains a medium which can be compressed as the hydraulic fluid in chamber 146 moves piston 144 to the right as shown in FIGS. 7 and 8. A suitable medium for use in chamber 148 is dry nitrogen or another non-explosive gas such as described above. A pressure gauge 166 may be connected to the chamber 148 of accumulator 142 by pressure line 168 for monitoring the gas pressure in the accumulator. A hydraulic line 170 connects line 50 the existing hydraulic line between pump 123 and the hoist valve and contains a shutoff valve 172.

The use and operation of the boom assist mechanism of the present invention, the assist cylinder 18, 40 is attached to the machine between the boom and the frame of the machine. The exact location, diameter and stroke of the assist cylinder 14, 40 must be selected to cooperate with the pressure and capacity of the accumulator 142, to maintain proper and consistent assistance in lifting the boom. Hence, the size, location and stroke of both the cylinder 140 and accumulator 142 will vary depending upon the application of the present invention. Further, the location of the assist cylinder 142 must be selected to operate cooperatively with the primary boom lift cylinder 14. It is advantageous in some applications to provide a plurality of boom assist cylinders 18, 140 and accumulators 142 for more efficient operation of the assist mechanism of the invention. Hydraulic line 152 is connected to tank 154 below minimum fluid operating level of the tank, and hydraulic fluid is applied from tank 154 to cylinder 140, hydraulic line 150 in chamber 146 principally from pump 123 through line 170. Chamber 148 is precharged with suitable quantity of gas so that, as the boom is moved for any position of the boom 20 lower than its maximum elevation, the gas in the chamber 148 exerts supplemental lifting force to the boom. For safety purposes it is desirable to release the pressure from the present mechanism when the mechanism is not in use, shutoff valve is provided. With shutoff valve 172 open, the pressure in the cylinder 140, line 150 and chamber 146 may be relieved to tank 154 through line 170. Pressure in chamber 148 is decreased to the to the pre-charge pressure in that piston 144 moves to the left as shown in FIGS. 7 and 8 under pressure from the gas.

When the boom is to be used, shutoff valve 172 is opened and the pressure in line 150 is quickly restored by the hydraulic system of the machine when operation of the boom commences. When the boom is raised for the first time, the elevation of the boom 20 will be performed principally by the hydraulic system of the machine. The shaft of cylinder 140 will extend increasingly outwardly from the cylinder 140 as the boom 20 is raised; however, the pressure with which the chamber 148 is charged will maintain piston 144 in a position so that chamber 146 is relatively small and chamber 148 is relatively large. Valve 172 is left open and pump 23 operates until the hydraulic pressure in line 150 is substantially the same as the pre-charged pressure in chamber 148. Valve 172 is then closed. When the boom is lowered as shown in FIG. 8, the shaft of assist cylinder 140 is moved into the cylinder and hydraulic fluid flows from the cylinder to chamber 146 of the accumulator 142. Piston 144 is moved in the direction of the gas containing chamber 148 thereby decreasing the size of chamber 148 and further compressing the gas therein.

The pressure in the assist system is not sufficient to raise the boom alone; however, the lift exerted on the boom 20 through the cylinder 140 by the pressurized gas reduces the effort required from the primary lift cylinders 140 to raise the boom 20. When the primary boom cylinder 140 is operated to raise the boom 20, the compressed gas assists the primary cylinder 140 in raising the boom 20. The gas compressed in chamber 148 and urges piston 144 to the left as shown in FIG. 8 which has the effect of urging boom 20 upwardly through the operation of assist cylinder 140. Thus much of the energy required for raising the boom 20 is supplied by the pressurized gas, and pressurization of the gas requires no additional energy expenditure, in that the compressed gas is further compressed by the heretofore waste of kinetic energy expended when the boom 20 is lowered. Lowering of the boom 20 moves the piston 144, thereby compressing the gas which then exits the primary cylinder 14 when the boom is again raised.

The potential energy present in the elevated mass is converted to kinetic energy when the boom 20 is lowered, but is particularly recaptured by the present mechanism as potential energy stored in the compressed gas of assist cylinder 140. The total energy required to raise the boom 20 remains the same with or without the present mechanism. However, when the boom assist mechanism is used, part of the total energy required to raise the boom is supplied from the compressed gas of the assist cylinder 140. Thus, the energy put into the system during the previous lift cycle is used to further compress the gas when the boom 20 is lowered. Hence of the total energy required to raise the boom in the next cycle part is supplied by the previous lift cycle which is captured by the compressed gas in assist cylinder 140. In effect, the present mechanism reduces the counteracting pressure exerted by the loaded boom 20 on the primary hydraulic cylinder 140, since the gas is compressed by the kinetic energy expended when the boom 20 is lowered.

If the boom 20 is raised while the valve 172 is closed after the hydraulic pressure has been relieved, check valve 156 will open and make up fluid will flow from tank 154. If line 150, cylinder 140 and chamber 146 have become over pressurized, relief valve 160 will open to relieve some fluid to the tank. Hence line 152 and 158 and valves 156 and 160 are provided for safety purposes.

As a result of the assistance provided the present mechanism various components like the engine operating the pump, the primary hydraulic cylinders 14 are operated less than maximum output and may be provided in smaller capacities resulting in substantial cost savings and fuel consumption. Assist is provided by the present boom assist mechanism enables the boom 20 to be raised more quickly thus reducing the time required for each cycle of boom operation and increasing the productivity of the boom.

While several embodiments have been disclosed herein, it is to be understood that the embodiments and variations shown and described are merely illustrative of the principles of the invention and that various modifications may be implemented by those skilled in the art without departing from the scope and spirit of the invention and the claims appended hereto.

What is claimed is:

1. A system for hydraulically raising and lowering a boom, said system comprising: a boom pivotally connected to a boom support, a hydraulic circuit connected to said boom and said boom support and configured to controllably raise and lower said boom relative to said boom support, and at least one assist cylinder comprising a first end pivotally secured to said boom, a second end pivotally secured to said boom support, and a substantially hollow interior containing a compressible medium therein.

2. The system of claim 1 wherein said hydraulic circuit comprises at least one hydraulic cylinder, each said hydraulic cylinder comprising an upper end pivotally secured to said boom and a lower end pivotally secured to said boom support.

3. The system of claim 2 wherein each said hydraulic cylinder comprises a chamber, a piston movably mounted in said chamber, and a rod secured to one side of said piston, said rod sealably extending from an exit end of said chamber and having a distal end comprising said upper end, said chamber having a closed end generally opposite said exit end, said lower end being external of said closed end, a first dynamic interior portion of said chamber being located between said closed end and said piston, a second dynamic interior portion being located between said one side and said exit end, each of said first and second dynamic interior portions containing hydraulic fluid and being in fluid communication with said hydraulic circuit.

4. The system of claim 1 wherein said compressible medium comprises a gas.

5. The system of claim 4 wherein said gas is selected from the group of gases consisting of: nitrogen, other non-combustible gases, and combinations thereof.

6. The system of claim 4 wherein said gas is nitrogen.

7. The system of claim 1 wherein said assist cylinder further comprises a movable piston sealably mounted about its periphery within said interior and a rod secured on one side of said piston and extending from said interior at an exit end thereof, said rod having a distal end comprising said first end, said interior further comprising a closed end generally opposite said exit end.

8. The system of claim 7 wherein said interior and said piston define a dynamic chamber located between said closed end and said piston.

9. The system of claim 8 wherein said rod comprises a chamber therein, said chamber being in fluid communication with said dynamic chamber through at least one medial vent in said piston.

10. The system of claim 9 wherein said compressible medium is caused to be compressed within a space defined by said chamber and said dynamic chamber being in fluid communication with each other when said hydraulic circuit is employed to lower said boom, said compressible medium being compressed to a pressure that generates a potential energy within said assist cylinder sufficient to assist said hydraulic circuit to subsequently raise said boom when said potential energy is converted to kinetic energy that causes said rod to extend from said interior due to the pressure in said space exerted on said piston, in order to exert generally upward force on said boom at said first end.

11. The system of claim 8 wherein said compressible medium is caused to be compressed within said dynamic chamber when said hydraulic circuit is employed to lower said boom, said compressible medium being compressed to a pressure that generates a potential energy within said assist cylinder sufficient to assist said hydraulic circuit to subsequently raise said boom when said potential energy is converted to kinetic energy that causes said rod to extend from said interior due to the pressure in said dynamic chamber exerted on said piston, in order to exert generally upward force on said boom at said first end.

12. The system of claim 7 wherein said interior comprises an inner diameter of between about 5 inches and about 11½ inches.

13. The system of claim 12 wherein said inner diameter is about 10 inches.

14. The system of claim 12 wherein said inner diameter is about 6½ inches.

15. The system of claim 9 wherein said chamber comprises an inner diameter between about 2 inches and about 6 inches.

16. The system of claim 15 wherein said inner diameter is about 4½ inches.

17. The system of claim 1 wherein said assist cylinder has a stroke distance of between about 35 inches and about 70 inches.

18. The system of claim 17 wherein said stroke distance is about 49 inches.

19. The system of claim 10 or claim 11 wherein said potential energy generated is converted to exert force measuring between about 20,000 $lb_f$ and 70,000 $lb_f$.

20. The system of claim 7 further comprising an expansion tank fluidly connected to said interior, said expansion tank containing additional amounts of said compressible medium.

21. The system of claim 20 further comprising a charge line and a relief line, said charge line fluidly connecting said tank to said interior at a first port proximate said closed end, said charge line being configured to charge said interior with said compressible medium from said tank to achieve a desired minimum pressure therein relative to the location of said piston therein, said relief line fluidly connecting said tank to said interior at a second port proximate said closed end, said relief line being configured to remove said compressible medium from said interior to said tank through said second port when actual pressure in said interior exceeds a threshold pressure.

22. The system of claim 21 further comprising a pump on said charge line between said tank and said first port, said pump being configured to transfer said compressible medium from said tank to said interior.

23. The system of claim 22 further comprising a check valve on said charge line configured to permit fluid flow through said charge line only in the direction of said first port.

24. The system of claim 21 further comprising a relief valve on said relief line, said relief valve being configured to open to allow said compressible medium to exit from said second port when said interior reaches said threshold pressure.

25. The system of claim 3 wherein each said hydraulic cylinder comprises a double acting hydraulic cylinder, said hydraulic circuit comprising a hydraulic fluid reservoir in fluid communication with at least one hydraulic pump, said hydraulic pump configured to selectively supply hydraulic fluid either to said first dynamic interior portion or said second dynamic interior portion through hydraulic lines connecting said pump to said first and second dynamic interior portions, additional hydraulic lines being provided to connect said first and second dynamic interior portions to said reservoir for directing said hydraulic fluid from the one of said first and second dynamic interior portions not supplied with hydraulic fluid by said hydraulic pump.

26. The system of claim 1 wherein said hydraulic circuit comprises at least one hydraulic cylinder, each said hydraulic cylinder comprising an upper end pivotally secured to said boom and a lower end pivotally secured to said boom support, said hydraulic cylinder further comprising a chamber, a piston movably mounted in said chamber and a rod secured to one side of said piston, said rod extending from an exit end of said chamber and having a distal end comprising said upper end, said chamber having a closed end generally opposite said exit end, said lower end being external of said closed end, at least a first dynamic interior portion of said chamber being located between said closed end and said piston, said first dynamic interior portion containing hydraulic fluid and being in fluid communication with said hydraulic circuit, said assist cylinder further comprising a movable assist piston sealably mounted within said interior, an assist rod secured on one side of said assist piston and extending from said interior at an assist cylinder exit end, said assist rod having a distal end comprising said first end, said interior further comprising an assist cylinder closed end generally opposite said assist cylinder exit end, said interior and said assist piston defining a dynamic chamber located between said assist cylinder closed end and said assist piston, said compressible medium being compressed within said dynamic chamber when said hydraulic circuit is used to retract said rod into said chamber to lower said boom, said assist rod being simultaneously retracted within said interior, the compression of said compressible medium increasing actual pressure within said dynamic chamber and generating a potential energy therein, said assist cylinder being configured to convert said potential energy to kinetic energy that assists the subsequent raising of said boom when said hydraulic circuit is used to extend said rod from said chamber, said hydraulic circuit expending less energy as a result of the kinetic energy used in said assist cylinder to extend said assist rod and exert a generally upward force to said boom at said first end.

27. The system of claim 2 wherein said first and second ends and said upper and lower ends comprise eyes.

28. The system of claim 27 wherein each said eye comprises a bearing.

29. The system of claim 28 wherein each said bearing is configured to receive a pin sized between about two inches and about six inches in diameter.

* * * * *